United States Patent Office 3,041,669
Patented July 3, 1962

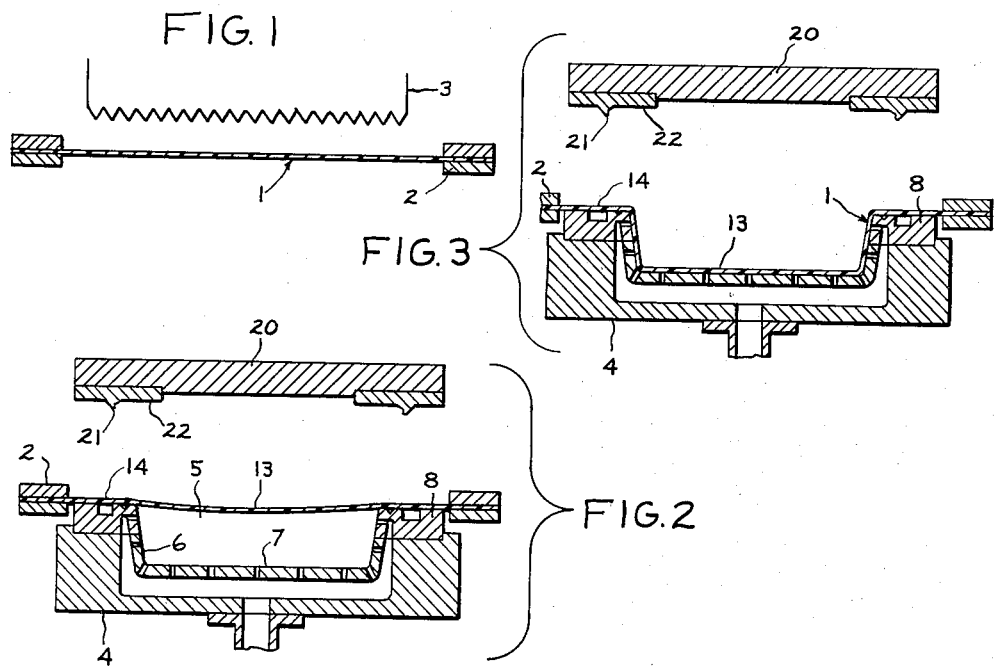
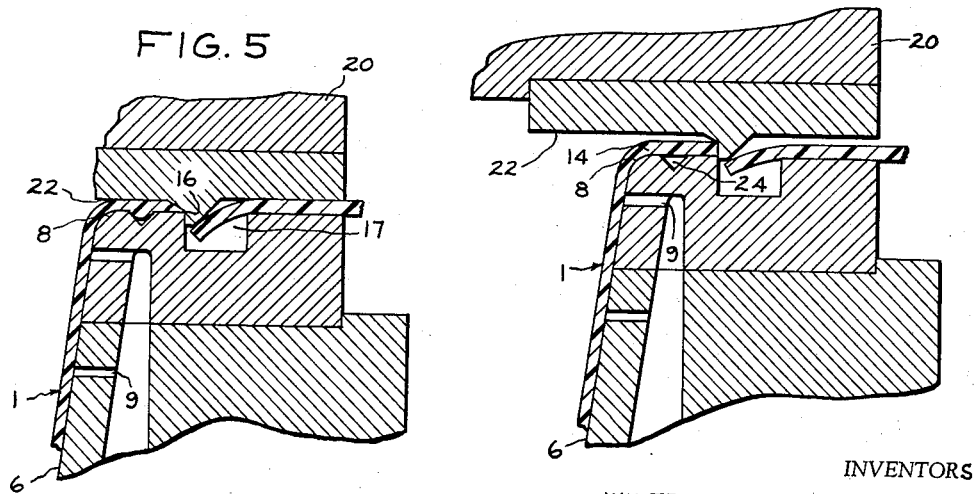
INVENTORS
WILFRED J. MARSHALL
& JULUIS B. HORVAY
BY *Walter E. Rule*
THEIR ATTORNEY

1

3,041,669
VACUUM FORMING APPARATUS
Wilfred J. Marshall and Julius B. Horvay, Louisville, Ky., assignors to General Electric Company, a corporation of New York
Filed Oct. 19, 1959, Ser. No. 847,367
2 Claims. (Cl. 18—19)

The present invention relates to vacuum forming apparatus and is particularly concerned with an improved apparatus for both vacuum forming a flanged article from a sheet of plastic material and molding and trimming the edge portion of the article to finished shape and size.

In the usual method of vacuum forming hollow articles such as refrigerator door panels and the like from plastic sheet material, a heated sheet of the plastic material is brought into sealing contact with the edge or face portions of a vacuum mold after which the space between the sheet and the mold is evacuated to cause the central portion of the heated sheet to assume the shape of the mold cavity. The resultant product comprises a central portion having the shape of the mold and a peripheral edge portion corresponding to that part of the sheet which was in contact with the edge or face portions of the mold. After the formed sheet has cooled to the point where it again becomes rigid so that no distortion of the formed article will take place upon removal from the mold, it is removed from the mold. Thereafter the excess sheet material is trimmed from the edges of formed article by suitable cutting dies. A disadvantage of this two-step method is that since some portions of the heated sheet are stretched and thinned during the vacuum forming operation to a greater extent than other portions, the peripheral edge or flange portions of the finished article because they have been stretched the least during the molding operation will normally be of a greater thickness than any of the remaining portion of the article and in itself may have an irregular thickness due to greater stressing and elongation of the sheet along the sides of the cavity than at and adjacent the corners of the cavity as it is drawn to the shape of the mold cavity. In addition, conventional trimming methods do not provide a completely satisfactory appearance for the exposed trimmed edges since many of the plastic materials suitable for vacuum molding have very little cold flow with the result that the trimmed edges clearly exhibit cut or fracture marks rather than a smooth hot molded appearance.

The present invention has as its principal object the provision of a vacuum molding apparatus by means of which the edges of flanges of the formed article can be trimmed while the vacuum formed part is still in the mold and at an elevated temperature.

Another object of the invention is to provide a vacuum molding apparatus including means for simultaneously trimming the vacuum formed part and molding the edges thereof to a substantially uniform thickness.

A further object of the invention is to provide means for trimming and forming the edge portions of a vacuum formed piece while still in the plastic stage which means anchors the peripheral edges of the piece to prevent deformation of the piece after separation thereof from the usual clamping means.

Further objects and advantages of the present invention will become apparent from the following description thereof when taken in connection with the accompanying

2 drawing and the features of novelty which characterize the invention will be pointed out with particularity in the claims annexed to and forming part of this specification.

In carrying out the present invention, there is provided apparatus for vacuum forming a flanged article from a heated sheet of plastic material comprising a vacuum mold including a cavity or principal shaping portion and a face or flange portion surrounding the cavity. The mold flange portion terminates in a peripheral cutting edge over which the warmed plastic sheet is anchored or clamped at the beginning of the molding operation. A trimming and flange forming member is provided for cooperative action to both trim the flange to the desired width and also form the flange to the desired uniform thickness during the vacuum forming operation. For this purpose, the forming and trimming member comprises a shearing element adapted to cooperate with the cutting edge provided on the mold for trimming the flange to the desired width and an adjacent face portion for contacting and compressing the remaining portion of the flange to a uniform thickness during the trimming operation. This face portion in cooperation with the mold face both compresses the flange edge of the article to a uniform thickness and also anchors this portion of the sheet which the shearing element has separated from the clamping means to prevent distortion of the formed article during the subsequent cooling operation. In order to assure this anchoring operation, a groove is provided between the mold cavity and the cutting edge of the mold and extending about the entire periphery of the cavity for receiving excess sheet material during the forming and trimming operation.

For a better understanding of the invention, reference is made to the following description and the accompanying drawing in which:

FIG. 1 is a diagrammatic view of an apparatus employed in the practice of the present invention illustrating one step in the forming process;

FIG. 2 is a view similar to FIG. 1 showing the formed sheet material in position with reference to the vacuum mold but prior to the molding thereof;

FIG. 3 is a view similar to FIG. 2 showing the sheet in its molded state;

FIG. 4 is an enlarged sectional view of a portion of the vacuum mold illustrating an initial stage of the trimming and flange forming operation; and FIG. 5 is a view similar to FIG. 4 illustrating the final stage in the trimming and forming operation.

Referring now to FIG. 1 of the drawing, a sheet of thermoplastic material 1 suitably supported or enclosed in a rectangular frame 2 is first heated to a softening temperature by an electric heating element 3 prior to the forming operation. The clamping frame 2 supports the sheet to limit sagging thereof the effect of the heating element 3. After the sheet 1 has been heated to the desired extent, it is placed as shown in FIG. 2 over a vacuum mold generally indicated by the numeral 4. For the purpose of illustrating the invention, the mold is disclosed as comprising a dish-shaped cavity as a shaping means, the cavity 5 comprising side walls 6 and a bottom wall 7. A peripheral flange or face portion 8 surrounding the cavity 5 provides a surface against which the sheet 1 is held in sealing engagement by the frame 2 during evacuation of the mold cavity 5 through the apertures 9 connecting the mold cavity with the evacuating chamber 10. While not shown, it will be understood that the mold 4 generally also includes means for cooling the mold cavity after shaping of the plastic material.

After the sheet 1 supported by the frame 2 is placed over the mold cavity 5 with the portions thereof adjacent the frame 2 in sealing engagement with the face or flange portion 8 of the mold, the mold cavity 5 is exhausted by means of a vacuum applied through the chamber 10 and the exhaust conduit 11. As the chamber is exhausted, the resulting higher atmospheric pressure on top of the warm plastic sheet forces it to deform and stretch downwardly until it contacts and assumes the contour of the mold cavity as illustrated in FIG. 3 of the drawing.

During this vacuum forming operation, the central portion 13 of the sheet 1 elongates and becomes thinner as it is drawn into contact with the inner surfaces of the mold cavity 5. On the other hand, the portion 14 overlying the face of flange mold portions 8 due to frictional engagement with these mold surfaces is subjected to less tension and hence less deformation with the result that this portion 14 forming a flange on the final molded article is generally thicker than the remaining sections of the article comprising the central sheet portion 13.

In accordance with the usual vcauum forming processes, the formed or shaped article is cooled and removed from the mold and is then trimmed to remove the unwanted portions of the flange 14. Since any substantial heating of the vacuum formed sheet at this stage will cause substantially deformation thereof, the trimming operation is normally carried out at room temperatures or below the softening point of the sheet material with the result that the cut edges are rather ragged and irregular in appearance.

In accordance with the present invention, the mold 4 is so designed that the trimming operation can be successfully carried out at the same time as, or as part of, the vacuum forming operation and the flange portion 14 of the finished article is molded or compressed to uniform thickness in the same operation.

For this purpose the face portion of the mold 4 which supports the peripheral portions of the plastic sheet during the vacuum forming operation is provided with a cutting edge 16 extending about the periphery of the mold cavity 5 and spaced therefrom a distance equal to the desired width of the flange 14. In the illustrated embodiment of the invention, this cutting edge is formed by one wall of rectangular recess 17 provided in the mold face. There is also provided a member 20 mounted for relative reciprocal and cooperative movement with the mold 4 and which is driven by any suitable press means (not shown) for movement into engagement with the face of the mold as soon as the sheet 1 has been drawn into the cavity 5. This member 20 includes a shearing element 21 which is adapted to cooperate with the cutting edge 16 to sever or cut the hot plastic sheet along the line of this cutting edge upon movement of the member 20 towards the mold 4. Inwardly from the shearing element 21 and opposite the face portion 8 of the mold, there is provided a face portion 22 on the member 21 which comes into contact with the flange portion 14 of the sheet material at substantially the instant that the shearing operation obtained by means of the cutting edges 20 and 21 is completed. The purpose of this portion of the member 20 is two-fold. First, it anchors the warm plastic material in this area to prevent shrinkage of the formed article while it is still warm and secondly it molds or compresses the flange 14 to a uniform thickness. In order to accommodate any excess plastic material as all or part of the flange 14 is reduced in thickness during this compressing operation and also to provide positive means for anchoring the flange 14 against the shrinkage forces set up during cooling of the molded plastic, a groove 24 is provided about the periphery of the mold cavity and between the cavity walls 6 and the cutting edge 21. As the face portion 22 of the member 20 moves into engagement with the plastic material forming the flange 14 some of this plastic material is driven or displaced into the groove 24. Normally, this groove will be full of plastic material adjacent any corners of the mold where there the least thinning of the portions of the plastic sheet overlying the mold face has taken place during the vacuum forming operation. As the relatively cold member 20 coming into contact with the flange 14 quickly cools or sets the plastic material, this cooling action assists the anchoring function of grooves 24. After the central portion 13 of formed article has also become cool and rigid, the article can be removed from the mold in its final shape completely separated from the excess plastic sheet retained in the frame 2 and ready for use.

From the foregoing it will be seen that there has been provided what may be described as a one-step process for both vacuum forming and trimming an article formed of a plastic sheet material. While the invention has been described with reference to a particular embodiment thereof, it will be understood that the invention is not limited thereto and it is intended by the appended claims to cover all such modifications as come within the spirit and scope of the invention.

What we claim as new and desire to secure by Letters Patent of the United States is:

1. Apparatus for vacuum forming an article having a peripheral flange from a sheet of thermoplastic material comprising a mold including walls defining a mold cavity and a flange portion surrounding said cavity, means comprising a frame surrounding said flange portion for holding a heated sheet of thermoplastic material in contact with said flange portion, means for exhausting the space between said sheet and said mold cavity whereby said sheet is caused to assume the shape of said cavity, said flange portion including a recess therein defining a cutting edge extending around said cavity between said frame and said cavity, and means for trimming the portion of said shaped sheet overlying said flange portion to form a flange of desired thickness and width about said cavity shaped portion of said sheet comprising a member movable relative to said mold and including a face portion for engaging and compressing to uniform thickness the portion of said sheet overlying said flange portion while said sheet is still warm and a shearing element cooperatively arranged with respect to said cutting edge to shear said sheet during compression thereof by said face portion, said mold flange portion including a groove extending about said cavity between said cavity and said cutting edge for receiving excess sheet material during said compressing operation and thereby assist in anchoring said shaped sheet to said mold flange portion after said sheet has been sheared.

2. Apparatus for vacuum forming an article having a peripheral flange from a sheet of thermoplastic material comprising a mold including walls defining a mold cavity and a flange portion surrounding said cavity, means comprising a frame surrounding said flange portion for holding a heated sheet of thermoplastic material in contact with said flange portion, means for exhausting the space between said sheet and said mold cavity whereby said sheet is caused to assume the shape of said cavity, said flange portion having a rectangular recess therein defining a cutting edge extending around said cavity between said frame and said cavity, and means for trimming the flange-engaging portion of said shaped sheet to form a flange of desired thickness and width about said cavity shaped portion comprising a member movable relative to said mold while said sheet is still warm and including a shearing element cooperatively arranged with respect to said cutting edge to shear said sheet and a face portion for engaging and compressing to uniform thickness the portion of said sheet overlying said flange portion during shearing thereof, said mold flange portion including a groove between said cavity and said cutting edge for receiving excess plastic material during said compressing operation, and thereby assist in anchoring said shaped sheet to said mold flange portion after said sheet has been sheared.

References Cited in the file of this patent

UNITED STATES PATENTS

| | | |
|---|---|---|
| 1,404,320 | Roberts et al. | Jan. 24, 1922 |
| 1,415,018 | Coates | May 9, 1922 |
| 2,234,839 | Edwards | Mar. 11, 1941 |
| 2,886,828 | Lattuca | May 19, 1959 |
| 2,891,280 | Politis | June 23, 1959 |
| 2,911,677 | Weber | Nov. 10, 1959 |
| 2,953,814 | Mumford | Sept. 27, 1960 |
| 2,967,328 | Shelby | Jan. 10, 1961 |

FOREIGN PATENTS

| | | |
|---|---|---|
| 495,376 | Belgium | Oct. 27, 1950 |